Figure 2:
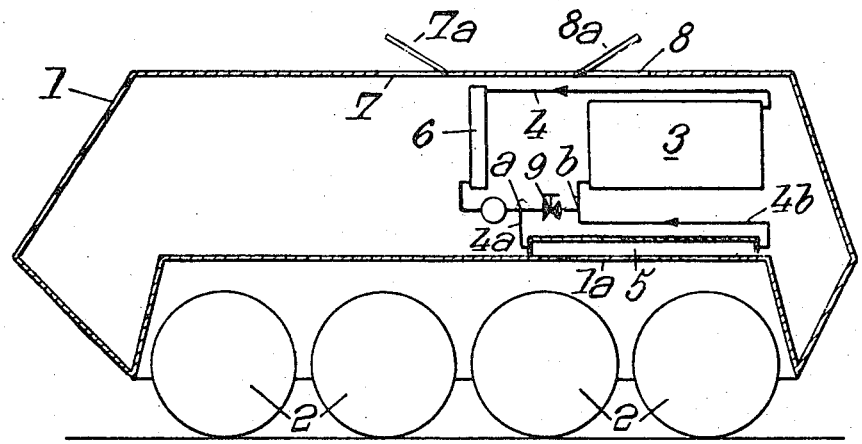

United States Patent [19]
Panhard

[11] 3,812,906
[45] May 28, 1974

[54] ARMORED VEHICLES HOUSING A COOLED ENGINE

[75] Inventor: Jean Panhard, Paris, France

[73] Assignee: Societe de Contrutions Mecaniques Panhard & Levassor, Paris, France

[22] Filed: Oct. 4, 1971

[21] Appl. No.: 186,301

[30] Foreign Application Priority Data
Oct. 6, 1970  France .............................. 70.35949

[52] U.S. Cl. ............... 165/44, 115/1 R, 123/41.01, 123/41.51
[51] Int. Cl. .......................... B60f 3/00, B60h 3/04
[58] Field of Search ...................... 165/44; 115/1 R; 123/41.01, 41.51

[56] References Cited
UNITED STATES PATENTS

| | | | |
|---|---|---|---|
| 1,236,813 | 8/1917 | Zimmerman................. | 123/41.51 X |
| 2,475,496 | 7/1949 | Hait .................................... | 115/1 R |
| 2,577,194 | 12/1951 | Jannsen ........................... | 165/44 X |
| 2,682,852 | 7/1954 | Ruffolo............................ | 165/44 X |
| 2,705,935 | 4/1955 | Peterson ........................... | 115/1 R |
| 3,176,585 | 4/1965 | Ruf.................................... | 115/1 R X |
| 3,240,179 | 3/1966 | Van Ranst......................... | 165/44 X |

*Primary Examiner*—Allan D. Hermann
*Attorney, Agent, or Firm*—Eric H. Waters

[57] ABSTRACT

The armored vehicle has a closed body comprising at least one internal engine equipped with a cooling system comprising at least one heat exchanger for the cooling fluid. The heat exchanger is constituted by at least one compartment housed inside the body of the vehicle and bounded in part by a conductive wall belonging to the body as an armor element. The removal of the major portion of the heat given up by the cooling fluid is effected through this wall. A conventional heat exchanger with ambient air cooling can also be provided. This conventional heat exchanger is isolated and rendered inoperative by a valve when the vehicle is in an operational situation or when its body must be entirely sealed with respect to the ambient medium.

9 Claims, 3 Drawing Figures

3,812,906

ARMORED VEHICLES HOUSING A COOLED ENGINE

The invention relates to armored vehicles comprising a closed body inside which is housed an engine (generally an engine intended to ensure the propulsion of the vehicle) equipped with a cooling system comprising a heat exchanger for the cooling of the fluid circulating in the said system; and it relates more particularly, because it is in this case that this application seems to have the most advantage, but not exclusively, among these vehicles, to military armored vehicles with a sealed body and more particularly also, to amphibious self-driven armored vehicles.

It is a particular object of the invention to render vehicles of the type concerned, such that the cooling system of their engine is adapted to operate efficiently when the body of the vehicle must be closed in a sealed manner, that is to say must not communicate with the external medium, which is the case, particularly, for military vehicles when they are called on to operate in a contaminated atmosphere or in an aquatic medium, that is to say under conditions where all risk of penetration, into the body of the vehicle of contaminated air or of water, must be avoided.

The armored vehicle with a closed body, according to the invention, which comprises at least one internal engine equipped with a cooling system comprising at least one heat exchanger for the cooling of the fluid circulating in this system, is characterised in that the abovesaid heat exchanger is constituted by at least one compartment housed inside the body of the vehicle and bounded in part by a conductive wall belonging to the said body as an armor element, through which wall the removal of the major portion of the heat given up by the cooling fluid is then effected.

Since the conductive wall which contributes to bounding the compartment forming the heat exchanger is constituted by an armor element of the said vehicle, this element then assumes a triple role, namely, the protection of the exchanger against projectiles, the transmission of heat towards the ambient medium and the function of a thermal bridge facilitating this transmission.

It should be noted that, when the armored vehicle is an amphibious vehicle, the compartment forming the exchanger is, preferably, arranged against a wall situated so as to be immersed when the vehicle moves in water, especially a wall belonging to the bottom of the armored body of the vehicle, so that the abovesaid compartment is cooled by the circulation of water along the external surface of this immersed wall.

On this subject, the abovesaid compartment can advantageously extend over the whole or part of the floor and/or of the bottom of the body of the vehicle and, especially, in the region of the narrowed bottom of the body provided to receive the wheel or track-laying system of the vehicle.

Although there can, in certain cases (for example, for self-propelled vehicles of low power or of moderate power, or vehicles for short missions), be envisaged the equipping of the cooling system of the engine only with one or several internal exchangers bounded in part by a conductive wall of the body of the vehicle, it will be advantageous on the other hand, in other cases (more powerful self-driven vehicles for example), to provide in addition the abovesaid cooling system with a conventional heat exchanger with ambient air cooling, means being provided to render this conventional heat exchanger inoperative when the vehicle is in an operational situation where its body must be entirely sealed with respect to the ambient medium.

In the latter cases, it is advantageous to make the conventional heat exchanger with a blower play the role of principal exchanger and to connect in parallel the internal exchanger involving the wall of the body, a valve device being provided to make the whole of the cooling fluid pass through the latter exchanger when the principal exchanger is out of service.

From the constructional point of view, the exchanger is preferably given a wall of flat form, the said exchanger being then constitutable by a curved metal sheet fixed by its edges, for example by welding, to the inner surface of a wall element of the vehicle.

The invention will, in any case, be better understood with the aid of the accompanying description which follows, as well as of the accompanying drawings, which complement and drawings relate to preferred embodiments of the invention, but which are in no way limiting.

Figure 1:
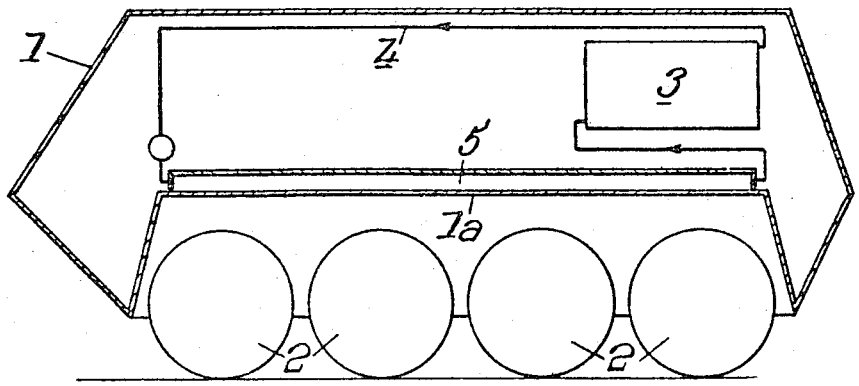
Figure 3:
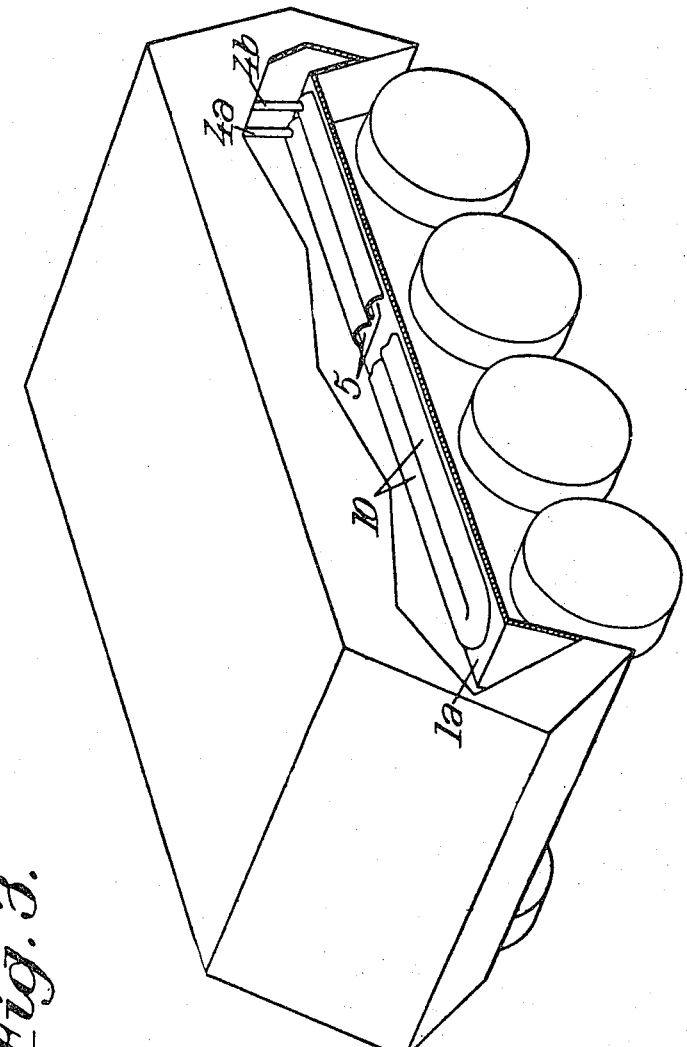

In the drawings:

FIGS. 1 and 2, show, in diagrammatic manner and in sectional elevation, two embodiments of a self-propelled armored vehicle of an amphibious type, according to the invention;

FIG. 3, lastly, illustrates a perspective view showing a heat exchanger forming part of the cooling circuit of the engine of the vehicle illustrated by the two preceding Figures.

FIG. 1 shows in diagrammatic manner in sectional elevation an amphibious armored vehicle comprising a body 1 supported by a wheel or track-laying assembly 2 and housing an engine 3, for example an internal combustion engine, intended to ensure the propulsion of the vehicle, the abovesaid engine 3 being equipped with a cooling system 4, preferably with forced circulation.

It should be noted that the cooling system 4 serves mainly the hot portions of the engine 3 proper, but it can if necessary serve, in addition, certain accessories of the said engine, such as, for example, a set of accessories, a torque converter, a compressor, etc.

According to the invention, the cooling circuit 4 comprises a heat exchanger constituted by a compartment 5 traversed by the cooling liquid, housed inside the armored body 1 of the vehicle and bounded, in part by a conductive wall 1a belonging to the said body, as armor element of the lower part or floor of the body 1.

In any case, the metallic element 1a of the body 1 contributing to bounding the compartment 5 protects the said compartment and ensures diffusion towards the outside of heat originating from the cooling liquid, this diffusion effect being reinforced when the vehicle is partially immersed. On the other hand, the body element 1a favors, by its thermal bridge, removal of calories.

Such a cooling system of the engine 3 presents the advantage of being entirely isolated from the ambient medium and of not being exposed to risks of deterioration or of clogging due to this ambient medium, which would be the case, for example, if the cooling system of the engine 3 brought into play circulation of pollutant ambient air or of ambient water, through an external heat exchanger, which ambient medium could contain troublesome substances.

In the embodiment illustrated in FIG. 1, the compartment 5 takes on alone the whole of the cooling of the engine 3.

In the embodiment illustrated in FIG. 2, there is seen an amphibious armored vehicle with a body 1 and a wheel or track-laying system 2, propelled by an engine 3, which engine is equipped with a cooling circuit 4 comprising a heat exchanger 5 which is partially bounded by a wall 1a of the armored floor of the body of the vehicle, but, in the case of this second embodiment, the heat exchanger 5 is simply an auxiliary exchanger, the cooling system 4 comprising, in addition, a conventional main exchanger 6 operating by circulation of ambient air due to an air intake port 7 and an air outlet port 8 arranged preferably, in the ceiling of the body 1 and capable of being closed respectively by a flap 7a and a flap 8a. Preferably, the wall 1a is situated under the engine compartment of the vehicle which is separated from the cockpit, so that the one or more occupants of the vehicle do not risk being distressed by the heat radiated towards the inside by the exchanger.

The auxiliary exchanger 5 is mounted in parallel on the principal cooling circuit 4 by means of inlet and outlet connecting pipes 4a and 4b.

A valve 9 is arranged between the connecting points a and b of the pipes 4a and 4b in the cooling circuit 4, the closing of this valve 9 making all of the cooling liquid pass through the auxiliary exchanger 5.

When the inside of the body 1 does not need to be isolated from the ambient medium, the flaps 7a and 8a are opened, the blower (not shown) is actuated and the principal exchanger 6 and the auxiliary exchanger 5 are both in service, the flow of cooling liquid passing through the auxiliary exchanger 5 being less by reason of the much more considerable pressure losses in the connecting pipes 4a, 4b and in the auxiliary exchanger 5 than in the section of pipe of the principal circuit 4 extending between the connecting points a and b.

When the vehicle undertakes a mission in the course of which the inside of the body 1 must be isolated from the ambient medium, especially when it is partly immersed, the blower is stopped, the flaps 7a and 8a are closed and the valve 9 is also closed, all of the cooling liquid then transversing the auxiliary exchanger 5.

It should be noted that, in the latter situation, the closing of the inlets and outlets of cooling air and the stopping of the blower enable use of about 10 percent more of the power of the engine 3.

In any case, and whatever the embodiment adopted, the heat exchanger 5 ensures, in cold weather, heating of the inner space of the body 1.

From the constructional point of view, the heat exchanger 5 has, preferably, a flat shape and can advantageously be constituted, as illustrated diagrammatically in FIG. 3, by soldering, or the inner surface of the armor plate 1a contributing to the bounding of this compartment, a thin sheet-metal section 10 capable of having a bent or sinuous shape, the ends of this sheet-metal section 10 then receiving the connecting pipes 4a and 4b of the heat exchanger.

It is appropriate, lastly to indicate that such a vehicle, of which the body contributes to bounding a heat exchanger, can be a terrestrial, maritime or aerial vehicle, whether or not self-propelled, provided with operators or remote-controlled and called on to effect several, even numerous, successive missions, or on the contrary, intended for a single mission, following which it is destroyed, which would be the case, for example, for an explosive attack vehicle.

As is self-evident, and as emerges already from the foregoing, the invention is in no way limited to those of its methods of application, nor to those of its methods of production of its various parts, which have been more especially indicated; it encompasses, on the contrary, all modifications.

I claim:

1. Armored vehicle with a closed body comprising at least one internal engine equipped with a cooling system comprising at least one heat exchanger for cooling the fluid circulating in said system, said heat exchanger being constituted by at least one compartment housed inside the body of the vehicle, a fluid-tight conductive wall of said body constituting an externally flat armor element and bounding said compartment in part, said compartment being adapted to be traversed by said fluid and said conductive wall being adapted to effect the removal directly to the exterior of the body of the major portion of the heat given up by said fluid, comprising in addition, a conventional heat exchanger with ambient air cooling, means being provided to isolate and render inoperative this conventional heat exchanger when the vehicle is in an operational situation where its body must be entirely sealed with respect to the ambient medium.

2. Armored vehicle according to claim 1, wherein the engine housed in the body of said vehicle is an engine for the propulsion of said vehicle.

3. Armored vehicle according to claim 1, wherein said vehicle is amphibious and the conductive wall is situated so as to be immersed when the vehicle moves in water.

4. Armored vehicle according to claim 1, wherein said conductive wall forms part of the lower body portion of the vehicle.

5. Armored vehicle according to claim 1, wherein said conductive wall forms part of the floor of the vehicle.

6. Vehicle according to claim 1, wherein the exchanger involving the wall of the body of the vehicle is flat.

7. Vehicle according to claim 1, wherein said at least one exchanger is formed partly by an element of the body of the vehicle and by a curved metal sheet fixed by its edges to said element.

8. Armored vehicle according to claim 1, wherein the conventional heat exchanger is arranged to play the role of a main exchanger and said at least one heat exchanger involving the wall of the body is connected as a branch line of the cooling system, a valve device being provided to direct the whole of said fluid through said exchanger involving the wall of the body when the main exchanger is inactivated.

9. Vehicle according to claim 8, wherein said exchanger involving the wall of the body is formed partly by an element of the body of the vehicle and by a curved metal sheet fixed by its edges to said element.

* * * * *